United States Patent
Zaccardi et al.

(10) Patent No.: US 10,378,556 B2
(45) Date of Patent: Aug. 13, 2019

(54) OUTLET GUIDE VANE FOR AIRCRAFT TURBINE ENGINE, PRESENTING AN IMPROVED LUBRICANT COOLING FUNCTION

(71) Applicant: SAFRAN AIRCRAFT ENGINES, Paris (FR)

(72) Inventors: Cedric Zaccardi, Saint Maur des Fosses (FR); Mohamed-Lamine Boutaleb, Paris (FR); Sebastien Christophe Chalaud, Vincennes (FR); Eric Pierre Georges Lemarechal, Alfortville (FR); Thierry Georges Paul Papin, Varennes-Jarcy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 276 days.

(21) Appl. No.: 15/403,727

(22) Filed: Jan. 11, 2017

(65) Prior Publication Data
US 2017/0204879 A1 Jul. 20, 2017

(30) Foreign Application Priority Data
Jan. 15, 2016 (FR) ..................... 16 50346

(51) Int. Cl.
*F01D 9/06* (2006.01)
*F02C 7/14* (2006.01)
(Continued)

(52) U.S. Cl.
CPC ......... *F04D 29/5853* (2013.01); *F01D 9/065* (2013.01); *F02C 7/14* (2013.01);
(Continued)

(58) Field of Classification Search
CPC .. F04D 29/5853; F04D 29/542; F04D 29/063; F04D 19/002; F28D 1/035;
(Continued)

(56) References Cited

U.S. PATENT DOCUMENTS 4,972,671 A * 11/1990 Asselin .................. F01D 9/065
184/6.11
8,616,834 B2 12/2013 Knight, III et al.
(Continued)

FOREIGN PATENT DOCUMENTS

FR 2 989 110 10/2013

OTHER PUBLICATIONS

French Preliminary Search Report dated Aug. 30, 2016 in French Application 16 50346 filed on Jan. 15, 2016 (with English Translation of Categories of Cited Documents).
(Continued)

*Primary Examiner* — Jacob M Amick
*Assistant Examiner* — Charles Brauch
(74) *Attorney, Agent, or Firm* — Oblon, McClelland, Maier & Neustadt, L.L.P.

(57) ABSTRACT

A guide vane for a dual flow aircraft turbine engine includes an aerodynamic part. The aerodynamic part includes an inner duct for lubricant cooling extending in a main direction and being partly bounded by a pressure side wall and a suction side wall of the vane. The aerodynamic part is embodied as a single piece, and includes heat transfer fins arranged in the duct expanding substantially parallel to a direction of the duct. The fins are spaced from each other depending on the direction of the duct and a transversal direction of the vane, so that at least some of the fins are arranged substantially staggered.

12 Claims, 6 Drawing Sheets

(51) Int. Cl.
*F02K 3/06* (2006.01)
*F28D 1/02* (2006.01)
*F28D 1/03* (2006.01)
*F04D 19/00* (2006.01)
*F04D 29/54* (2006.01)
*F04D 29/58* (2006.01)
*F28D 21/00* (2006.01)
*F04D 29/063* (2006.01)

(52) U.S. Cl.
CPC .............. *F02K 3/06* (2013.01); *F04D 19/002* (2013.01); *F04D 29/063* (2013.01); *F04D 29/542* (2013.01); *F28D 1/0206* (2013.01); *F28D 1/035* (2013.01); *F05D 2220/323* (2013.01); *F05D 2220/36* (2013.01); *F05D 2230/30* (2013.01); *F05D 2240/12* (2013.01); *F05D 2260/22141* (2013.01); *F28D 2021/0021* (2013.01); *F28D 2021/0089* (2013.01); *F28F 2250/02* (2013.01); *Y02T 50/676* (2013.01)

(58) Field of Classification Search
CPC .......... F28D 1/0206; F02K 3/06; F01D 9/065; F02C 7/14; F05D 2240/12; F05D 2220/323; F05D 2230/30; Y02T 50/676; F28F 2250/02
See application file for complete search history.

(56) References Cited

U.S. PATENT DOCUMENTS

| | | | |
|---|---|---|---|
| 2010/0236213 A1* | 9/2010 | Schilling | F01D 25/14 60/39.08 |
| 2011/0061846 A1* | 3/2011 | Morris | B21C 37/205 165/181 |
| 2014/0318148 A1* | 10/2014 | Clemen | F02C 7/28 60/796 |
| 2015/0337734 A1 | 11/2015 | Chalaud | |
| 2016/0201919 A1 | 7/2016 | Chalaud | |

OTHER PUBLICATIONS

U.S. Appl. No. 15/306,936, filed Oct. 26, 2016, Sebastien Chalaud.

* cited by examiner

OUTLET GUIDE VANE FOR AIRCRAFT TURBINE ENGINE, PRESENTING AN IMPROVED LUBRICANT COOLING FUNCTION

TECHNICAL FIELD

This invention relates to the aircraft dual flow turbine engines field, and in particular the design of guide vanes arranged in the entirety or part of an air flow from a turbine engine fan.

This pertains preferably to outlet guide vanes, also known as OGV, designed to straighten the airflow at the fan outlet. Alternatively or simultaneously, if necessary, guide vanes could be placed at the fan inlet. The guide vanes are classically arranged in the turbine engine secondary vein.

The invention preferably pertains to an aircraft turbojet equipped with such outlet guide vanes.

PRIOR STATE OF THE ART

On some dual-flow turbojets, there have been instances where the outlet guide vanes are implemented downstream of the fan to straighten the flow coming out of it, and also eventually to provide a structural function. This last function is indeed intended to allow the passage of efforts from the centre of the turbine engine to an outer ring located in the extension of the fan housing, in this case, a motor attachment is classically arranged on or near this outer ring, to ensure the attachment between the turbine engine and a hanging mast on the aircraft.

Recently, it has also proposed to allocate an additional function to the outlet guide vanes. It is a heat exchanger function between the outside air traversing the crown of the outlet guide vanes, and the lubricant circulating inside the vanes. For example, this heat exchanger function is known from document U.S. Pat. No. 8,616,834, or document EN 2 989 110.

The lubricant designed to be cooled by output guide vanes can come from different zones of the turbine engine. Indeed, a lubricant can be circulating through the lubrication enclosures for the antifriction bearings supporting the engine shafts and/or the fan hub, or even a lubricant dedicated to the lubrication of the mechanical transmission components of the AGB ("Accessory Geared Box"). Finally, it can also be used for lubrication of a gearbox to drive the fan, where such gearbox is expected on the turbine engine in order to decrease the fan rotation speed.

The growing lubricant needs require us to adapt accordingly the heat dissipation ability associated with heat exchangers used for lubricant cooling. The fact of attributing a heat exchanger role to the outlet guide vanes, as in the solutions mentioned in the two documents cited above, allows in particular to decrease, or even to remove conventional exchangers of type ACOC (Air Cooled Oil Cooler). These ACOC exchangers are generally arranged in the secondary vein, their reduction/suppression allows to limit the disruption of the secondary flow and thus increase the overall turbine engine performance.

However, the solutions proposed in the prior art remain perfectible. In particular, there is a need to improve the thermal exchanges to further increase the heat dissipation capacity. There is a need for reinforcement of the mechanical strength and resistance to leaking when facing high pressures generated by the circulation of lubricant within these vanes. This need for reinforcement of the mechanical strength is also even more important in the particular case of a guide vane with a structural function.

SUMMARY OF THE INVENTION

To meet these needs at least partially, the purpose of the invention is first aimed at a guide vane to be arranged in all or part of an air flow from a dual flow aircraft turbine engine fan, the guide vane including a foot, a head, and an aerodynamic flow straightening part laid out between the foot and the head of the vane, said aerodynamic vane part having a first inner lubricant cooling duct extending in a first main cooling lubricant flow direction from the vane foot to the head, said first inner duct being partly bounded by a vane pressure side wall and a vane suction side wall.

According to the invention, the aerodynamic part of the vane is made from a single piece which also includes heat transfer fins, arranged in said first duct connecting the pressure side walls and suction side walls and expanding substantially parallel to the first direction, and that the heat transfer fins are spaced from one another according to the first direction as well as in a transverse direction of the vane from a leading edge to a trailing edge of its aerodynamic part, so that at least some of said fins are arranged substantially staggered.

Thanks to its production from a single part, the invention allows to get around the sealing and mechanical problems encountered in the known products from prior art, particularly in the solution described in document U.S. Pat. No. 8,616,834. In addition, the orientation and arrangement of the fins provide a high thermal performance, while limiting the load losses suffered by the lubricant traversing through the first inside duct equipped with fins.

The invention also shows at least one of the following optional features, taken alone or in combination.

The first inside duct includes at least one zone in which said heat transfer fins are planned in a density between 1 and 5 fins/cm$^2$.

Said first inside duct has a variable density of fins, even if alternatively, a reasonably uniform density within this first duct could be arranged. This ability to vary the density of the fins in particular to locally adapt the heat exchange between the lubricant and the secondary flow. As an indication, the density can be reduced in zones where the heat exchange coefficient with the air is the greatest, while conversely, the fin density is preferentially increased in zones where the heat transfer coefficient is the lowest.

This ability to vary the fin density within the first inner duct, in a transverse direction to the vane, also allows to check the homogeneity/heterogeneity of lubricant flow in this same direction, depending on the needs encountered.

Besides, the first inner duct may present at least a first zone and a second zone offset from the first zone in the transverse direction, the second zone with an average height between the pressure side and suction side that is lower than the average height of the first zone, and said first zone having an average fin density greater than that of the second zone. This special design allows advantageously to get a more or less homogeneous lubricant flow in the transverse direction of the first inner duct, despite its evolutionary height along this same direction.

Moreover, said first duct may define a lubricant thawing channel spreading according to the first main direction, said channel being devoid of fins all along this channel. Alternatively, this may be a channel in which fins are located, but in a lower density than that adopted in adjacent zones. In both cases, this allows to manage the specific flight phases in which the lubricant drops to very low temperatures, giving it a high viscosity. Indeed, thanks to this so-caked "thawing" channel planned within the first inner duct, the lubricant can flow easier through this duct through the dedicated channel, and allows at the same time to warm the frozen lubricant between the fins of the zones adjacent to said channel. In this respect, it is stated that thawing channel is preferentially planned at one of the ends of the first inner duct, depending on the transverse direction of the latter.

The vane might only include as a single first duct, ensuring the flow of lubricant radially outward. In this case of figure, the crown of guide vanes would include at least one other vane of similar design, with an inner duct ensuring the flow of lubricant radially inward.

However, the vane's aerodynamic part preferably comprises a second inner lubricant cooling duct spreading according to a second main direction of lubricant flow from the head to the foot of the vane, said second inner duct being partly delimited by the vane's pressure side wall and suction side wall, heat transfer fins being arranged in said second duct connecting the pressure side and suction side walls and extending substantially parallel to the second direction, and the heat transfer fins are spaced from each other according to the second direction as well as the vane transverse direction so that at least some of such fins are arranged substantially staggered in the said second inner duct.

According to one possibility, the first and second inner ducts each extend separately throughout the aerodynamic part of the vane.

According to another possibility, the fluids of the first and second inner ducts are connected to one another near the head of the vane, and the average density of fins within the first inner duct is preferably less than the density of fins within the second inner duct. Indeed, since the lubricant is colder in the return direction adopted within the second inner duct, it makes it possible to increase the thermal power exchanged by increasing the average fin density in this second duct.

Preferably, the guide vane has a structural function, in the sense that it permits transmitting forces from the centre of the turbine engine to an outer ring located in the extension of the fan housing.

The invention is also intended for aircraft turbojets, preferably a turbojet including a plurality of guide vanes such as those described above, arranged downstream or upstream of a turbine engine fan.

Finally, the invention is a method for making such a guide vane, said aerodynamic part of the vane being manufactured in one piece using additive manufacturing. This type of manufacturing is perfectly adapted to the design of the vane, in particular because it allows to easily change the density of fins.

Other advantages and features of the invention will appear in the open-ended detailed description below.

BRIEF DESCRIPTION OF THE DRAWINGS

This description will be made in the light of the attached drawings including.

DETAILED DESCRIPTION OF THE PREFERRED EMBODIMENTS

Figure 1:
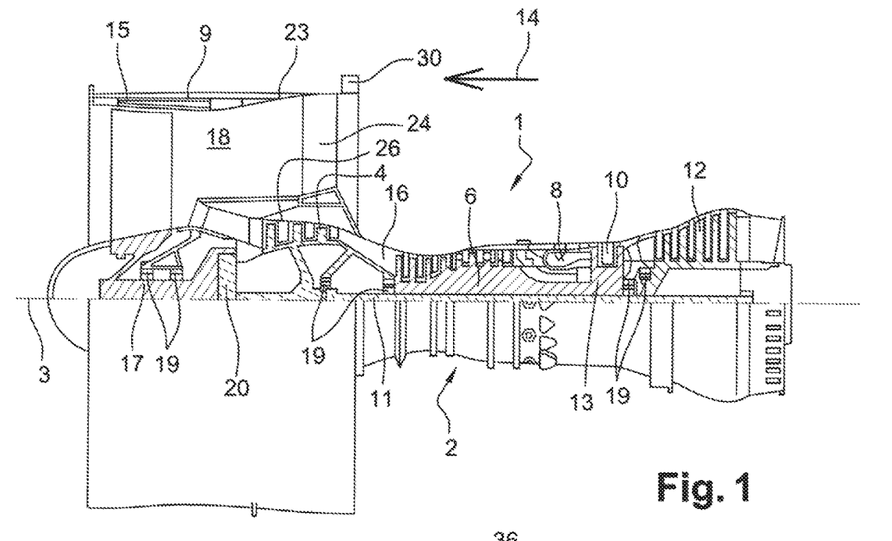
FIG. 1 showing a schematic view side of the turbofan according to the invention.

With reference to FIG. 1, it represents a dual-flow and a dual-body turbojet 1, with a high dilution rate. The turbojet 1 is classically comprised of a gas generator 2 on either sides of which are arranged a low pressure compressor 4 and one low pressure turbine 12, this gas generator 2 comprising a high pressure compressor 6, a combustion chamber 8 and a high pressure turbine 10. Subsequently, the terms "front" and "back" are considered according to an opposite direction 14 to the main flow direction of the gases within the turbojet, this direction 14 being parallel to its longitudinal axis 3. However, the terms "upstream" and "downstream" are considered according to the main flow direction of the gas within the turbojet.

The low pressure compressor 4 and the low pressure turbine 12 form a low pressure body, and are connected to each other by a low-pressure shaft 11 centred on the axis 3. Similarly, the high pressure compressor 6 and the high-pressure turbine 10 form a high pressure body, and are connected to each other by a high pressure shaft 13 centred on the axis 3, and arranged around the low pressure shaft 11. The shafts are supported by antifriction bearings 19, which are lubricated by being arranged in oil enclosures. The same applies to the fan hub 17, also supported by the antifriction bearings 19.

The turbojet 1 is also comprised of, at the front of the gas generator 2 and the low pressure compressor 4, a single fan 15 which is arranged here directly in the back of an engine air intake cone. The fan 15 is rotating about the axis 3, and surrounded by a fan housing 9. In FIG. 1, it is not driven directly by the low pressure shaft 11, but only indirectly driven by the shaft via a gearbox 20, which allows it to turn at a slower speed. Nevertheless, a direct drive solution of the fan 15, by the low pressure shaft 11, is part of the invention.

In addition, the turbojet 1 defines a primary vein 16 intended to be traversed by a primary flow, as well as a secondary vein 18 intended to be traversed by a secondary flow located radially outward from the primary flow, the fan flow thus being divided. As skilled industry persons know, the secondary vein 18 is bounded radially outward in part by an external ring 23, preferably metal, extending to the rear fan housing 9.

Although this has not been represented, the turbojet 1 is equipped with a set of equipment, for example of types fuel pump, hydraulic pump, alternator, starter, variable pitch stator actuator (VSV), discharge vane actuator, or even electric power generator. This includes equipment for lubrication of the gearbox 20. These equipment are driven by an accessory box or AGB (not shown), which is also lubricated.

Downstream from the fan 15, in the secondary vein 18, a crown of guide vanes is planned which here are outlet guide vanes 24 (OGV). These stator vanes 24 connect the external ring 23 to a housing 26 surrounding the low pressure compressor 4. They are spaced from each other on the circumference, and allow to straighten the secondary flow after it passes through the fan 15. In addition, these vanes 24 may also have a structural function, as is the case in some examples which are described herein. They ensure the transfer of the forces from the gearbox and the antifriction bearings 19 on the engine shafts and the fan hub, towards the outer ring 23. Then, these forces may transit through an engine attachment 30 attached on the ring 23 and linking the turbojet to a hanging mast (not shown) of the aircraft.

Finally, the outlet guide vanes 24 ensure, in the examples that are currently described, a third heat exchanger function between the secondary airflow traversing the crown of vanes, and the lubricant circulating inside the vanes 24. The lubricant designed to be cooled by the outlet guide vanes 24 is the one used for the lubrication of antifriction bearings 19, and/or the turbojet equipment, and/or accessories box, and/or the gearbox 20. These vanes 24 are thus part of the fluid circuit(s) in which the lubricant is put into circulation to successively lubricate the associated elements, then to be cooled.

In reference to FIGS. 2 to 5 now, we will describe one of outlet guide vanes 24, according to a first, preferred embodiment of the invention. In this respect, it is noted that the invention as it will be described with reference to FIGS. 2 to 5 may apply to all vanes 24 in the stator crown centred on the 3 axis, or only some of these vanes.

Figure 2:
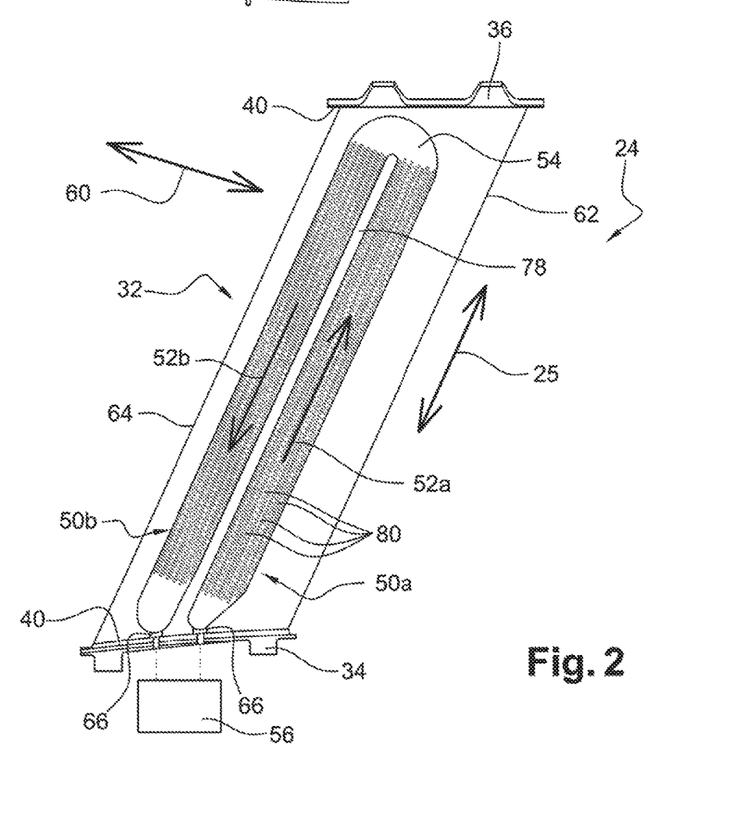
FIG. 2 represents a magnified, more detailed view of a turbofan outlet guide vane shown in the previous figure, according to a preferred first embodiment of the invention.

The vane 24 can be strictly of radial orientation as shown in FIG. 1, or be slightly tilted axially as shown in FIG. 2. In all cases, it is preferentially straight in the side view such as shown on FIG. 2, while extending in a longest extent direction 25.

The outlet guide vane 24 is comprised of an aerodynamic part 32 which corresponds to its central part, i.e. the one exposed to the secondary flow. On either side of this aerodynamic part 32 used to straighten the flow out of the fan, the vane 24 is respectively comprised of a foot 34 and a head 36.

The foot 34 serves for the attachment of the vane 24 on the low pressure compressor housing, while the head is used to attaching the same vane on the outer ring extending the fan housing. In addition, the vane 24 comprises at the foot and head levels, platforms 40 used to reconstruct the secondary vein between the vanes 24, in the circumferential direction.

One of the features of the invention lies in the manufacturing of a single piece of the so-called aerodynamic part 32 of the vane, preferably by additive manufacturing 3D printing or direct manufacturing. For example, additive manufacturing of the aerodynamic part 32 is carried out by one any of the following techniques:

Selective Laser Melting (SLM) or Electron Beam Melting (EBM);
Selective Laser Sintering (SLS) or by electron beam;
Any other type of powder solidification technique under the action of an energy source of medium to high power, the principle is to melt or sinter a bed of metal powder by laser beam or electron beam.

The powder used is aluminium-based, or based on another metallic material.

Moreover, the manufacturing of a single part may also include the foot 34 and/or head 36 and/or platforms 40, without getting out of the scope of the invention.

In this first preferred embodiment of the invention, the aerodynamic part 32 is equipped with two inner ducts 50a, 50b substantially parallel one to the other, and parallel to the longest extent direction 25. More specifically, this is a first lubricant cooling inner duct 50a, which extends in a first main direction 52a of the lubricant flow. This direction 52a is substantially parallel to the longest extent direction 25, and presents a direction going from the foot 34 to the head 36. Similarly, a second lubricant cooling inner duct 50b is planned, which extends in a second main direction 52b of lubricant flow within this duct. This direction 52b is substantially parallel to the longest extent direction 25, and presents a reverse direction going from the head 36 to the foot 34. So, the first duct 50a is planned to be traversed radially outward by the lubricant, while the second duct 50b is expected to be traversed radially inward. To address the transition from one to the other, near the head 35, the radial external ends of the fluids of the two ducts 50a, 50b are connected by an elbow 54 to 180°, corresponding to a low made in the aerodynamic part 32.

The radial internal ends of the two ducts 50a, 50b are related to the lubricant circuit 56, sketched by the element 56 in FIG. 2. This circuit 56 includes in particular a pump (not shown), which can apply a desired flow direction to the lubricant within ducts 50a, 50b, namely the introduction of the lubricant by the inner radial end of the first duct 50s, and the extraction of the lubricant at the inner radial end of the second duct 50b. Couplings 66 ensure fluid communication between the inner radial ends of the ducts 50a, 50b and circuit 56, these fittings 66 traversing the foot 34.

The two ducts 50a, 50b as well as the elbow 54 form together a general U form, with the first duct 50a and the second duct 50b separated from one another in a transverse direction 60 of the vane substantially orthogonal to the longest extent direction 25. In this first preferred embodiment as well as in all other modes, to optimize the heat exchanges, the first duct 50a is located on the trailing edge 62 side of the vane 24, while the second duct 50b is located on the leading edge 64 side. However, a reverse situation can be retained, without getting out of the scope of the invention.

Figure 3:
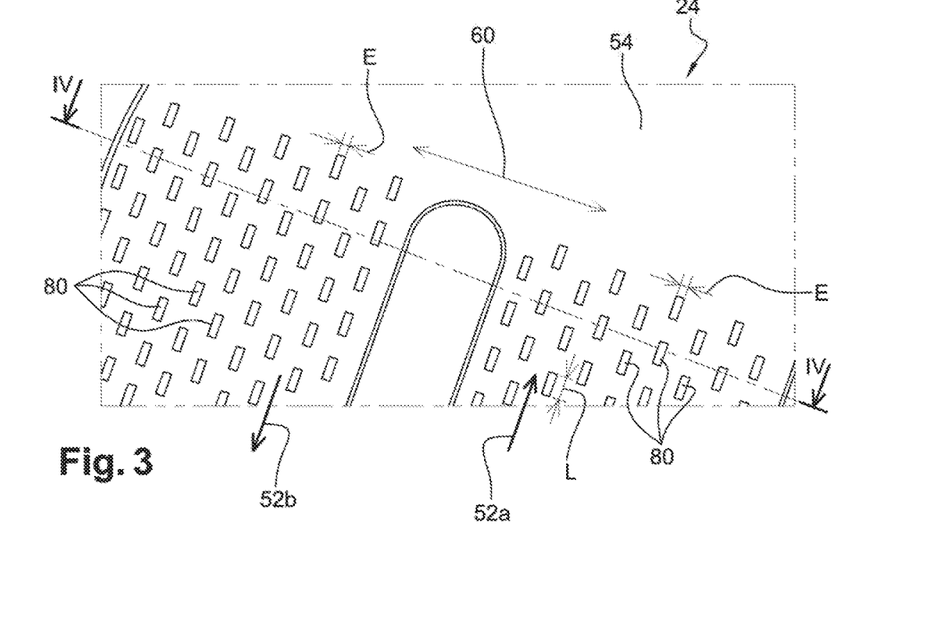
FIG. 3 is a magnified view of a part of the outlet guide vane shown in the previous figure.

The aerodynamic part 32 of the outlet guide vane 24 has a pressure side wall 70, a suction side wall 72, a full zone 74 connecting the two walls 70, 72 near the trailing edge 62, a full zone 76 connecting the two walls 70, 72 near the leading edge 64, as well as a central full zone 78. This last zone 78 connects the two walls 70, 72 to the level of a substantially central portion of these, depending on the direction of the vane cord It also serves as a structural reinforcement and extends from the foot 34 to the elbow 54, while the full zones 74, 76 extend substantially on the entire length of the part 32, according to the longest extent direction 25. The first duct 50a is formed between the walls 70, 72 and between the full zones 74, 78, while the second duct 50b is formed between the walls 70, 72 and the full zones 76, 78. The pressure and suction side walls 70, 72 present substantially constant thickness, next to ducts 50a, 50b that they delimit. However, 50a, 50b ducts extend transversely according to 60 management by presenting a height variable between the two walls, 70, 72, as this can be seen in FIG. 4. Alternatively, ducts 50a, 50b might have a constant height, but in this case the two walls 70, 72 would then adopt a variable thickness to obtain the vane aerodynamic profile.

Figure 4:
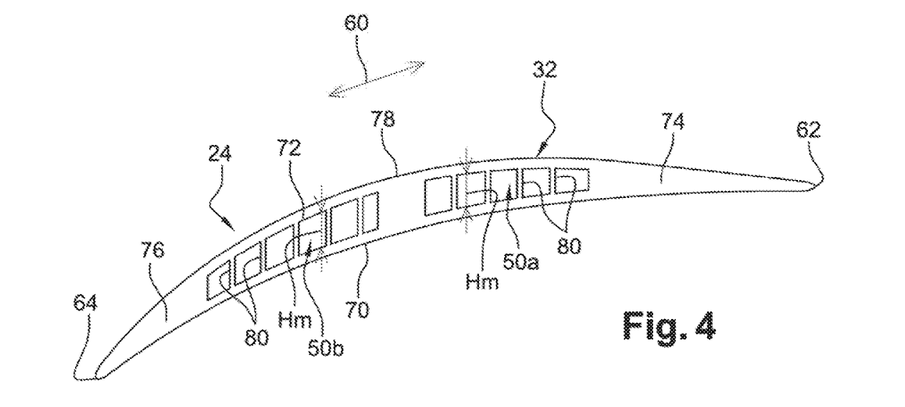
FIG. 4 corresponds to a sectional view taken along IV-IV of FIG. 3.

The two inner lubricant cooling ducts 50a, 50b present the peculiarity of integrating heat transfer fins. In this first preferred embodiment of the invention, the arrangement and the shape of the fins 80 are substantially identical in the two ducts 50a, 50b. They are also planned to have the same densities, although this may be otherwise, as this will come out of the other embodiments which will be described later. Therefore, only the fins 80 of the first inner duct 50a will now be described, but it must be understood that this description is also applicable by analogy to the fins of the second inner duct 50b.

The fins 80 are arranged locally substantially orthogonally to the pressure side and suction side walls 70, 72 that they connect, and with which they are made of one piece by additive manufacturing. They have an average height Hm, between the two walls, 70, 72, of the order of 4 to 8 mm. Their thickness E, depending on the transverse direction 60, presents a preferably constant value between 0.5 and 1.5 mm, whereas their length according to the direction 52a presents a preferably constant value between 1 and 4 mm.

The fins 80 extend in length parallel to the first direction 52a, and are spaced from each other not only according to direction 52a, but also depending on the transverse direction 60. The spacing between the fins 80 according to each of the two directions 52a, 60 are for example in the order of 2 to 4 mm.

In at least one zone of the duct 50a, and preferably in the entirety of the latter, the fins 80 are arranged staggered, with a density for example of about 3 fins/cm$^2$. For example, more generally, the average density is included between about 1 and 5 fins/cm$^2$.

The special staggered arrangement of fins 80, combined with their arranged length L in the main direction of flow 52a, allows obtaining high thermal performance by limiting the load losses suffered by the lubricant in operation.

Figure 5:
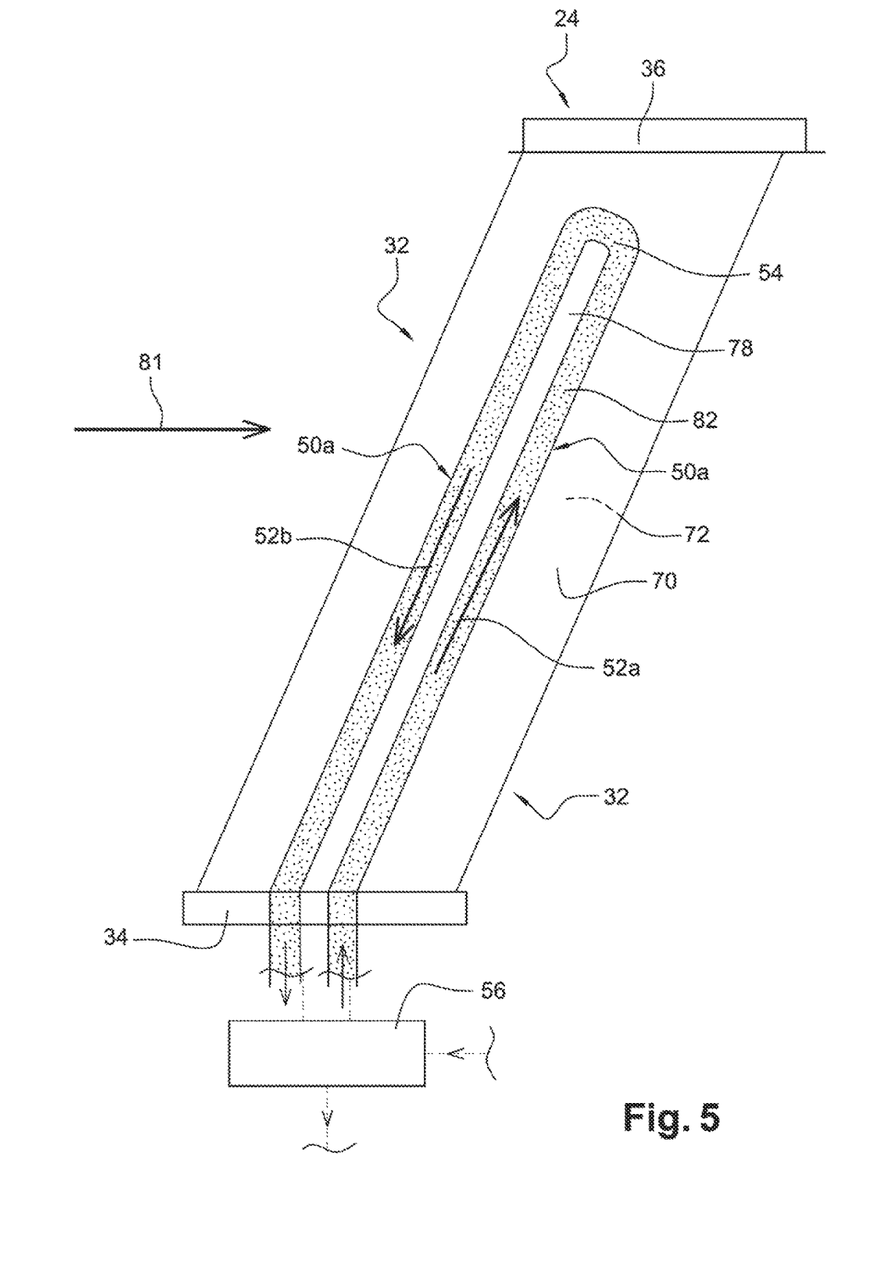
FIG. 5 shows the operation of the heat exchanger formed by the outlet guide vane shown in the previous figures, according to a first principle of operation.

During this operation sketched in FIG. 5, the lubricant 82 flowing through the circuit 56 is introduced in the first inner duct 50a, in the first 52a ranging radially in the outward direction. At this stage, the lubricant 82 presents a high temperature. A heat exchange is performed between this lubricant 82 conforming to the fins (not shown in FIG. 5) of the first duct 50a, and the secondary flow 81 conforming to the outer surface of the pressure side walls and suction side walls 70, 72 supporting these fins. The lubricant 82, after been redirected by the elbow 54 in the second duct 50b, suffers in the latter a similar cooling, always by heat exchange with the secondary air flow 81 and circulating according to the second main direction 52b of flow. Then the cooled lubricant 82 is extracted from vane 24, and redirected by the closed-circuit 56 towards the elements to lubricate.

Figure 6:
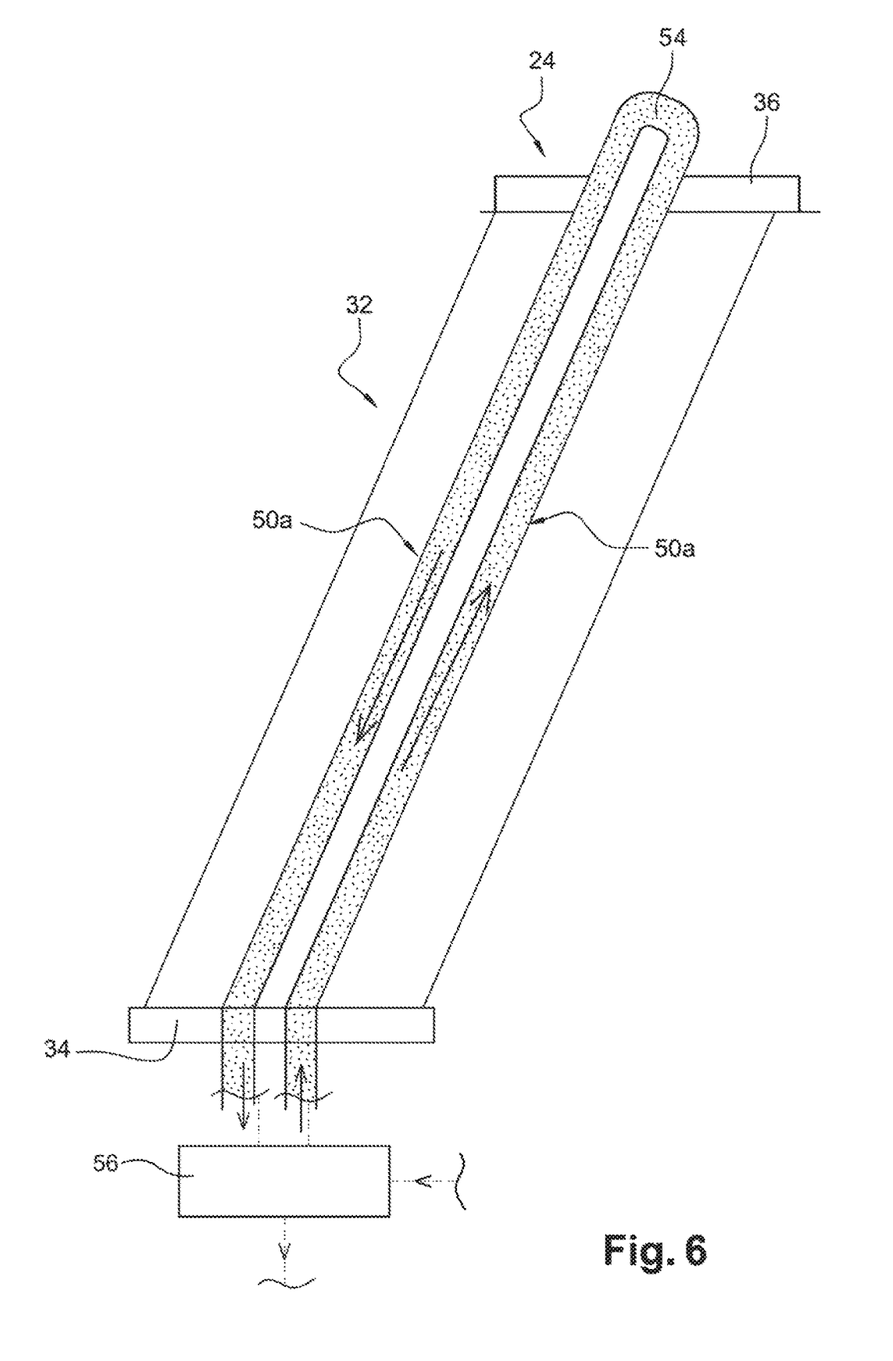
FIG. 6 is a view similar to that of FIG. 5, with an outlet guide vane in the form of a second preferred embodiment of the invention.

Referring now to FIG. 6, a second preferred embodiment in which ducts 50a, 50b are not connected within the aerodynamic part 32 of vane 24. They indeed stretch each separately on the length of the aerodynamic part 32, to connect the fluids to outside the vane 24. For example, to do this, a connection elbow 56 is planned arranged radially inward from the head of the vane 36, for example in support on this head.

Figure 7:
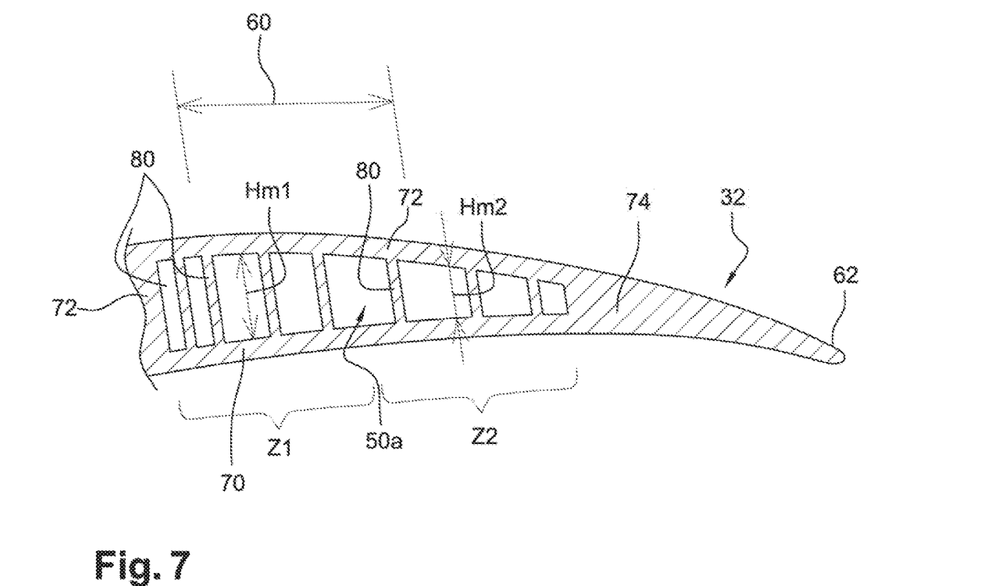
FIG. 7 is a view similar to that of FIG. 4, with an outlet guide vane in the form of a third preferred embodiment of the invention.

Now, with reference to FIG. 7 representing a third preferred embodiment of the invention, it is expected that the density of the heat transfer fins 80 in the first and/or the second duct 50a, 50b should be variable, that is non-uniform. Indeed, in this third mode, we seek a significantly homogeneous lubricant flow obtaining the transverse direction 60 of the first duct 50a, despite its evolving height between the two pressure side and suction side walls 70, 72. Thus, the first inner duct 50, for example a first zone Z1 located upstream in the transverse direction 60 and thus far from the trailing edge 62, as well as an adjacent second zone 22 located further downstream in the transverse direction 60, and thus closer to the trailing edge 62. The spacing between the pressure side and suction side walls 70, 72 is growing from the downstream end of the duct 50a. Therefore, the second Z2 shows fins whose average height Hm2 is less than the average height Hm1 of fins 80 of the first zone Z1. Also, to get the sensitive uniformity of the lubricant flow in transverse direction 60 of the duct 50a, it is preferentially expected that the first zone Z1 presents an average density of fins 80 higher than the density expected within the second zone Z2. This higher density in the zone Z1 is essentially achieved by bringing the fins 80 closer to each other, in the transverse direction 60.

Although it was not represented, a symmetrical layout can be adopted in the second duct, the spacing between the pressure side and suction side walls 70, 72 narrows towards the leading edge.

Figure 8:
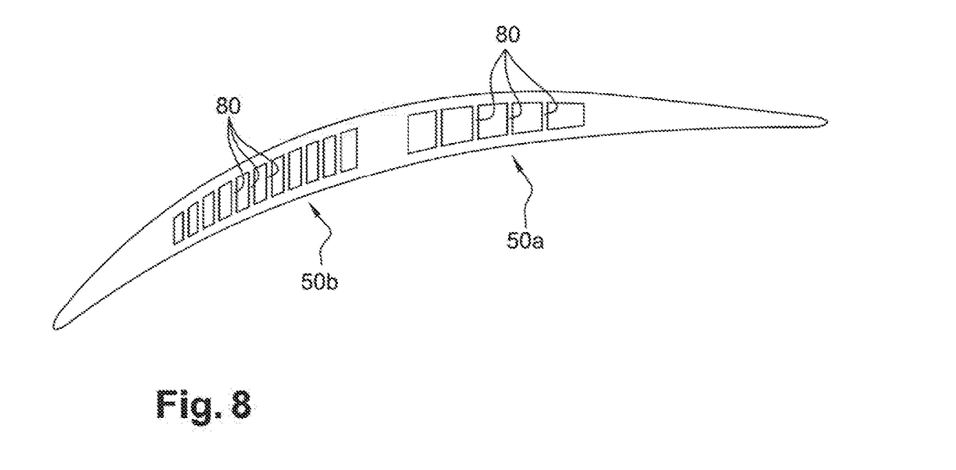
FIG. 8 is a view similar to that of FIG. 4, with an outlet guide vane in the form of a fourth preferred embodiment of the invention.

FIG. 8 represents a fourth preferred embodiment of the invention, in which the average density of fins 80 within the first inner duct 50a is less than the density of fins in the second inner duct 50b. This allows increasing the thermal power exchanged at the level of lubricant in the return direction, at a stage where it is colder because of the thermal power has already been exchanged within the first ducts 50a, in the lubricant outbound direction.

Figure 9:
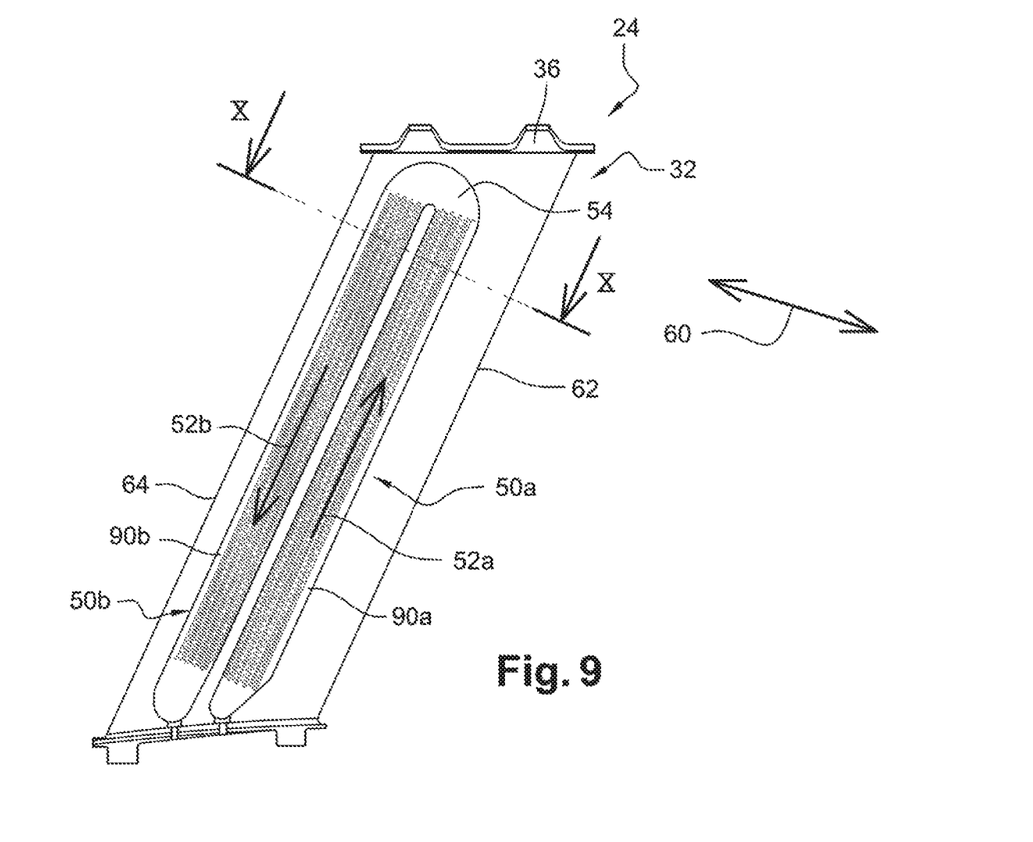
FIG. 9 is a view similar to that of FIG. 5, with an outlet guide vane in the form of a fifth preferred embodiment of the invention.
Figure 10:
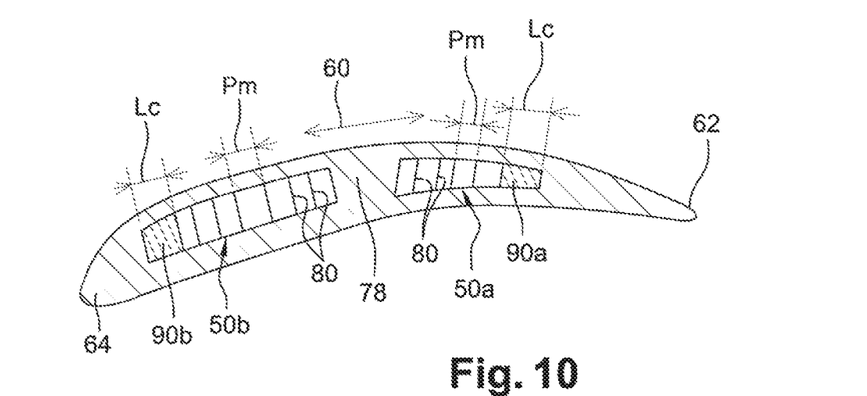
FIG. 10 corresponds to a sectional view taken along line X-X of FIG. 9.

Finally, FIGS. 9 and 10 represent a fifth preferred embodiment, in which it is expected a thawing channel 90a, 90b, in each of the two inner ducts 50a, 50b. In the first duct 50a, the channel 90a runs parallel to the first direction 52a, by being located closer to the trailing edge 62. Symmetrically, channel 90b runs parallel to the second direction 52b by being located closer to the leading edge 64. Here the position near the trailing edge was privileged, because this is the zone in which the heat exchange with the secondary air flow is the highest.

Each of these two channels 90a, 90b spans the entire length of its associated duct, coming out in the elbow 54. In this fifth preferred embodiment, each thawing channel 50a, 50b is deprived if fins 80 on its entire length, that is completely empty to promote circulation of cold lubricant by limiting load losses.

The presence of these channels 90a, 90b allows managing the particular flight phases in which this lubricant shows low temperatures, which makes it viscous and giving it so-called "freezing" aspect. Through these channels 90a, 90b, viscous lubricant can more easily flow through the inner ducts 50a, 50b, using the channels 90a, 90b located at the ends. The circulation of lubricant within these channels 90a, 90b allows gradually warming the frozen lubricant in the other parts of the ducts 50a, 50b, between the fins 80.

For an optimal operation, the width Lc of each channel 90a, 90b, according to the transverse direction 60, is greater than the average transverse step Pm between the fins 80 of its associated duct 50a, 50b. The ratio between these two dimensions Lc, Pm is preferably greater than 1.5, and more preferably greater than 2.

Alternatively, the channels 90a, 90b could integrate heat transfer fins 80, but in a lower density than that adopted in adjacent zones. This density reduced within the channels 90a, 90b would be then obtained mainly by increasing the average transverse step between the fins 80, within these thawing channels 90a, 90b.

Of course, various changes can be made by a skilled person to the invention that has just been described, only as open-ended examples, in particular, the technical characteristics specific to each of the five embodiments described above can be combined between them, without getting out of the scope of the invention. Finally, it is noted that in the non illustrated case of the inlet guide vanes to straighten the airflow upstream of the fan, these vanes are arranged in the entire air flow of the fan around an inlet cone of non-rotating air, the vane feet being then related to this fixed cone of intake air.

The invention claimed is:

1. A guide vane to be arranged in all or part of an air flow of an aircraft turbine engine fan with dual flow, the guide vane comprising:
   a foot;
   a head; and
   an aerodynamic part for straightening the air flow arranged between the foot and the head of the guide vane, said aerodynamic part of the guide vane comprising a first inner duct for lubricant cooling extending according to a first main direction of lubricant flow from the foot to the head of the guide vane, said first inner duct being partly bounded by a pressure side wall and a suction side wall of the guide vane,
   wherein the aerodynamic part of the guide vane is embodied as one piece including heat transfer fins, arranged in the first duct connecting the pressure side and suction side walls and expanding substantially parallel to the first direction, and
   wherein the heat transfer fins are spaced from each other according to the first direction and in a transverse direction of the guide vane from a leading edge towards a trailing edge of the aerodynamic part, so that at least some of the heat transfer fins are significantly arranged staggered.

2. The guide vane according to claim 1, wherein the first inner duct includes at least one zone in which the heat transfer fins are planned in a density between 1 and 5 fins/cm$^2$.

3. The guide vane according to claim 1, wherein said first inner duct presents a variable density of heat transfer fins.

4. The guide vane according to claim 3, wherein said first inner duct has at least a first zone and a second zone offset from the first zone in the transverse direction, the second zone with an average height between the pressure side and suction side walls, which is less than an average height of the first zone, and wherein said first zone presents an average density of heat transfer fins greater than that of the second zone.

5. The guide vane according to claim 1, wherein said first duct defines a lubricant thawing channel extending according to the first main direction, an entire length of said lubricant thawing channel being devoid of heat transfer fins.

6. The guide vane according to claim 1, wherein the aerodynamic part of the guide vane further comprises a second inner duct for lubricant cooling extending according to a second main flow direction of the lubricant ranging from the head to the foot of the guide vane, said second inner duct being partly bounded by the pressure side wall and the suction side wall of the guide vane, the heat transfer fins being arranged in said second duct connecting the pressure side and suction side walls and extending substantially parallel to the second direction, and wherein the heat transfer fins are spaced from each other according to the second direction and according to the transverse direction of the guide vane so that at least some of said heat transfer fins are arranged substantially staggered in the second inner duct.

7. The guide vane according to claim 6, wherein the first and second inner ducts extend each separately throughout an entirety of the aerodynamic part of the guide vane.

8. The guide vane according to claim 6, wherein the first and second inner ducts are connected to each other near the head of the guide vane, and wherein an average density of heat transfer fins within the first inner duct is less than a density of heat transfer fins within the second inner duct.

9. The guide vane according to claim 1, wherein the guide vane has a structural function.

10. An aircraft turbine engine, including a plurality of guide vanes according to claim 1, arranged downstream or upstream of a fan of the aircraft turbine engine.

11. A manufacturing method of the guide vane according to claim 1, comprising manufacturing said aerodynamic part of the guide vane in one piece by additive manufacturing.

12. The guide vane according to claim 1, wherein a thickness of the heat transfer fins is constant in the transverse direction.

* * * * *

UNITED STATES PATENT AND TRADEMARK OFFICE
CERTIFICATE OF CORRECTION

PATENT NO. : 10,378,556 B2
APPLICATION NO. : 15/403727
DATED : August 13, 2019
INVENTOR(S) : Cedric Zaccardi et al.

It is certified that error appears in the above-identified patent and that said Letters Patent is hereby corrected as shown below:

In the Specification

Column 1, Line 29, change "housing, in" to --housing. In--;

Column 3, Line 2, change "this so-caked" to --this so-called--;

Column 4, Line 1, change "along IV-IV" to --along line IV-IV--;

Column 5, Line 32, change "first, preferred" to --first preferred--;

Column 6, Line 22, change "head 35, the" to --head 36, the--;

Column 7, Line 19, change "length according" to --length L according--;

Column 8, Line 3, change "22 located" to --Z2 located--;

Column 8, Line 67, change "examples, in" to --examples. In--; and

In the Claims

Column 10, Line 34, change "engine, including" to --engine including--.

Signed and Sealed this
Fifth Day of May, 2020

Andrei Iancu
*Director of the United States Patent and Trademark Office*